United States Patent
Mao et al.

(10) Patent No.: US 11,325,666 B2
(45) Date of Patent: May 10, 2022

(54) VEHICLE AND METHOD FOR MANUFACTURING VEHICLE BODY

(71) Applicant: Chery New Energy Automobile Technology Co., Ltd., Wuhu (CN)

(72) Inventors: Weidong Mao, Wuhu (CN); Junfeng Zhou, Wuhu (CN); Chengwen Wang, Wuhu (CN); Xinwen Xi, Wuhu (CN); Fagui Wu, Wuhu (CN); Hao Yuan, Wuhu (CN); Yajun Lu, Wuhu (CN); Qiang Tang, Wuhu (CN)

(73) Assignee: Chery New Energy Automobile Technology Co., Ltd., Wuhu (CN)

( * ) Notice: Subject to any disclaimer, the term of this patent is extended or adjusted under 35 U.S.C. 154(b) by 0 days.

(21) Appl. No.: 17/015,355

(22) Filed: Sep. 9, 2020

(65) Prior Publication Data
US 2021/0070386 A1 Mar. 11, 2021

(30) Foreign Application Priority Data
Sep. 11, 2019 (CN) .......................... 201910859455.1

(51) Int. Cl.
*B62D 65/00* (2006.01)
(52) U.S. Cl.
CPC .................................. *B62D 65/00* (2013.01)
(58) Field of Classification Search
CPC ....................... B62D 65/00; B29C 2045/0079
See application file for complete search history.

(56) References Cited

U.S. PATENT DOCUMENTS

| | | | | | |
|---|---|---|---|---|---|
| 4,883,310 | A | * | 11/1989 | Miyazaki | B62D 25/06 296/210 |
| 5,527,404 | A | * | 6/1996 | Warren | C22F 1/05 148/688 |
| 6,250,410 | B1 | | 6/2001 | Balestrini et al. | |
| 6,276,748 | B1 | * | 8/2001 | Gobessi | B62D 29/001 296/190.02 |

(Continued)

FOREIGN PATENT DOCUMENTS

| | | |
|---|---|---|
| CN | 101190432 A | 6/2008 |
| CN | 101954349 A | 1/2011 |

(Continued)

OTHER PUBLICATIONS

Machine Translation of CN-102114873-A (Year: 2011).*

(Continued)

*Primary Examiner* — Jacob J Cigna
(74) *Attorney, Agent, or Firm* — Neugeboren O'Dowd PC

(57) ABSTRACT

A method for manufacturing an aluminum alloy vehicle body includes the following steps: vehicle body part molding, including: profile stretch-bending and machining; vehicle body frame assembly welding, including: performing assembly welding on a lower vehicle body, left and right side panels, and front and rear roof crossbeams; outer panel manufacturing, including: manufacturing an outer panel by injection molding; and whole vehicle assembling, including: assembling interior trim parts and the outer panel to a vehicle body frame, and assembling chassis parts to the vehicle body frame. The vehicle body parts and the vehicle body frame are made of an aluminum alloy material, and the outer panel is made of a non-metallic composite material.

7 Claims, 2 Drawing Sheets

(56) References Cited

U.S. PATENT DOCUMENTS

| | | | |
|---|---|---|---|
| 8,641,133 B1 | 2/2014 | Scaringe et al. | |
| 8,690,226 B2* | 4/2014 | Ellis | B60N 2/012 296/181.2 |
| 9,174,680 B2* | 11/2015 | Joyce | B62D 65/00 |
| 10,065,230 B2* | 9/2018 | Joyce | B62D 29/008 |
| 10,835,942 B2* | 11/2020 | Weykamp | B60R 19/18 |
| 2003/0230443 A1* | 12/2003 | Cramer | B60G 3/20 180/65.51 |
| 2005/0116460 A1 | 6/2005 | McGill et al. | |
| 2005/0189790 A1* | 9/2005 | Chernoff | B62D 25/04 296/193.05 |
| 2012/0068496 A1* | 3/2012 | Ellis | B60N 2/012 296/181.1 |
| 2015/0115663 A1* | 4/2015 | Joyce | B62D 29/008 296/193.12 |
| 2015/0336157 A1* | 11/2015 | Joyce | B62D 29/008 29/897.2 |
| 2016/0060440 A1* | 3/2016 | Prieto | C08L 23/14 523/436 |
| 2017/0144341 A1* | 5/2017 | Ashtiani | E05B 85/10 |
| 2018/0056352 A1* | 3/2018 | Weykamp | C22F 1/04 |
| 2019/0085182 A1* | 3/2019 | Goedhart | C09C 1/0021 |

FOREIGN PATENT DOCUMENTS

| | | | |
|---|---|---|---|
| CN | 102114873 A | * | 7/2011 |
| CN | 102114873 A | | 7/2011 |
| CN | 202368496 U | | 8/2012 |
| CN | 102991605 A | * | 3/2013 |
| CN | 102991605 A | | 3/2013 |
| CN | 105691462 A | | 6/2016 |
| CN | 106696163 A | | 5/2017 |
| CN | 208530711 U | | 2/2019 |
| CN | 109383625 A | | 2/2019 |
| CN | 109822198 A | | 5/2019 |
| CN | 109985939 A | | 7/2019 |

OTHER PUBLICATIONS

Machine Translation of CN-102991605-A (Year: 2013).*
CNIPA, "First office action of Chinese application No. 201910859455.1", dated Apr. 1, 2020, p. 22, Published in: CN.
CNIPA, "Second office action of Chinese application No. 201910859455.1", dated May 12, 2020, p. 25, Published in: CN.
CNIPA, "Third office action of Chinese application No. 201910859455.1", dated Aug. 5, 2020, p. 25, Published in: CN.
Zhou et al., "Forming of Aluminium Alloy Extruded Profiles", Jul. 15, 2012, pp. 216-221, Published in: CN.
Signorini, Luca, "Extended European search report of counterpart EP application No. 20195340.3", dated Feb. 15, 2021, p. 12, Published in: EP.
"The Aluminium Automotive Manual: 3.3.4 Forming Methods", 2002, pp. 39-45, Publisher: European Aluminium Association.

* cited by examiner

VEHICLE AND METHOD FOR MANUFACTURING VEHICLE BODY

This application claims priority to Chinese Patent Application No. 201910859455.1, filed on Sep. 11, 2019, the entire contents of which are incorporated herein by reference.

TECHNICAL FIELD

The present disclosure belongs to the technical field of vehicle manufacturing, and more particularly to a vehicle and a method for manufacturing a vehicle body.

BACKGROUND

Although traditional processing methods are relatively mature, existing vehicle manufacturing methods are complicated in process flow, and thus this industry still has common problems of a complex vehicle body structure due to a large number of parts, a long manufacturing flow, complex process equipment, and high production energy consumption. FIG. 1 shows the existing method for manufacturing a vehicle with a steel body. The method includes four steps: a part molding step, a vehicle body frame welding step, a vehicle body spraying step, and a whole vehicle assembly assembling inspection and road test step. Each step is completed by multiple sub-steps correspondingly. First, with respect to the vehicle body part molding step, stamping molding is adopted. For example, for a left side outer panel, a heavy-duty single-action high-speed mechanical press of 800 tons to 2,400 tons and a mold of 300 tons to 320 tons and costing about RMB 13.5 million are required, resulting in complicated production and high cost. In addition, it needs five sub-steps: uncoiling, blanking (where a material utilization rate is only 42% to 45%), drawing, flanging and shaping, trimming and punching. The power consumption of a single part is about 2.4 kWh per time, and generally, a vehicle body in white includes about 400 stamped parts. It is conceivable that the total power consumption in the vehicle body part molding step is huge. Second, the vehicle body frame welding step includes the following sub-steps: performing assembly welding on a lower vehicle body, left and right side panels and front and rear roof crossbeams, welding a top cover, welding a front wheel casing reinforcement plate (current: 8,000 A to 15,000 A, and time: 0.5 seconds to 1 second). The power consumption of a single vehicle reaches about 90 kWh to 97 kWh, which is large. Third, the anti-corrosion spraying of the steel vehicle body assembly includes the following sub-steps: degreasing (temperature: 40° C. to 45° C., and time consumed: 30 seconds to 60 seconds), surface adjustment (pH value: 8.0 to 9.5, and spray pressure: 0.04 MPa to 0.08 MPa), phosphating (time consumed: 30 seconds to 60 seconds), electrophoresis (thickness of an electrophoresis solution: 20 μm to 30 μm, temperature: 27° C. to 29° C., and time consumed: 3 minutes to 5 minutes), ultrafiltration (UF) washing (time: consumed 20 seconds to 30 seconds), drying (temperature: 160° C. to 180° C., and time consumed: 30 minutes to 40 minutes), PVC sealing (thickness: 500 μm to 800 μm), drying (temperature: 155° C. to 165° C., and time consumed: 25 minutes to 32 minutes), middle coating (thickness: 30 μm to 40 μm), drying (temperature: 140° C. to 150° C., time consumed: 25 minutes to 32 minutes, and forced cooling time: 6 minutes to 8 minutes), spraying a color varnish (thickness: 30 μm to 40 μm, and leveling time: 10 min to 15 min), drying (temperature: 180° C. to 200° C., and time consumed: 20 minutes to 30 minutes), finishing, and painting the vehicle body assembly. The investment of the production line reaches about RMB 200 million, the power consumption of the single vehicle is 300 kW to 367 kW, and the construction of the production line takes about 2 years. As a result, this step is complicated, costly, and time-consuming. Finally, the whole vehicle assembly assembling inspection and road test step includes the following sub-steps: interior trim parts assembling, chassis assembling, interior trim parts reassembling, and the like. Thus, the process of the above existing vehicle manufacturing method has defects such as time-consuming vehicle manufacturing steps, high energy consumption in the manufacturing process, large consumption of raw materials, and great weight of the whole vehicle.

SUMMARY

According to one aspect of the present disclosure, a method for manufacturing a vehicle body is provided. The method includes the following steps:

vehicle body part molding, including: profile stretch-bending and machining;

vehicle body frame assembly welding, including: performing assembly welding on a lower vehicle body, left and right side panels, and front and rear roof crossbeams;

outer panel manufacturing, including: manufacturing an outer panel by injection molding; and whole vehicle assembling, including: assembling interior trim parts and the outer panel to a vehicle body frame, and assembling chassis parts to the vehicle body frame, wherein the vehicle body frame is made of an aluminum alloy material, and the outer panel is made of a non-metallic composite material.

Optionally, the vehicle body frame welding further includes: welding a rear drip slot; assembling four doors and two covers; performing post-welding treatment; and forming a vehicle body-in-white assembly.

Optionally, MIG welding is adopted in the welding of the rear drip slot, with a welding current of 80 A to 160 A and a voltage of 2.2 V to 24 V.

Optionally, the outer panel manufacturing further includes: successively performing UF washing and drying on injection-molded parts; and successively performing primer spray, color varnish spray and roasting on the dried injection-molded parts.

Optionally, during performing the UF washing and the drying on the injection-molded parts, the UF washing lasts for 20 seconds to 30 seconds, the drying lasts for 30 seconds to 60 seconds at the temperature of 40° C. to 45° C.; and during performing the primer spray, the color varnish spray and the roasting on the dried injection-molded parts, a thickness of a primer is 10 μm to 15 μm, a thickness of a color varnish is 48 μm to 62 μm, and the roasting lasts for 25 minutes to 30 minutes at the temperature of 70° C. to 80° C.

Optionally, manufacturing the outer panel by the injection molding includes: feeding and heating, and mold closing and extruding.

Optionally, during manufacturing the outer panel by the injection molding, for the outer panel, a linear expansion coefficient is controlled to be less than 45 ppm/c, and a shrinkage rate is controlled to be less than 5%.

Optionally, the whole vehicle assembling further includes: reassembling interior trim parts; and filling and performing electrical inspection, performing line inspection and dynamic road test, printing a compliance certificate, and warehousing a qualified whole vehicle.

Optionally, the material of the vehicle body frame includes an aluminum-magnesium alloy.

According to another aspect of the present disclosure, a vehicle is provided, and includes the aluminum alloy vehicle body manufactured by the above method for manufacturing the aluminum alloy vehicle body.

BRIEF DESCRIPTION OF THE DRAWINGS

The content expressed in the drawings in the description and the marks in the drawings are briefly explained below.

DETAILED DESCRIPTION

Specific embodiments of the present disclosure will be further described in detail through the description of the embodiments with reference to the drawings below.

Figure 2:
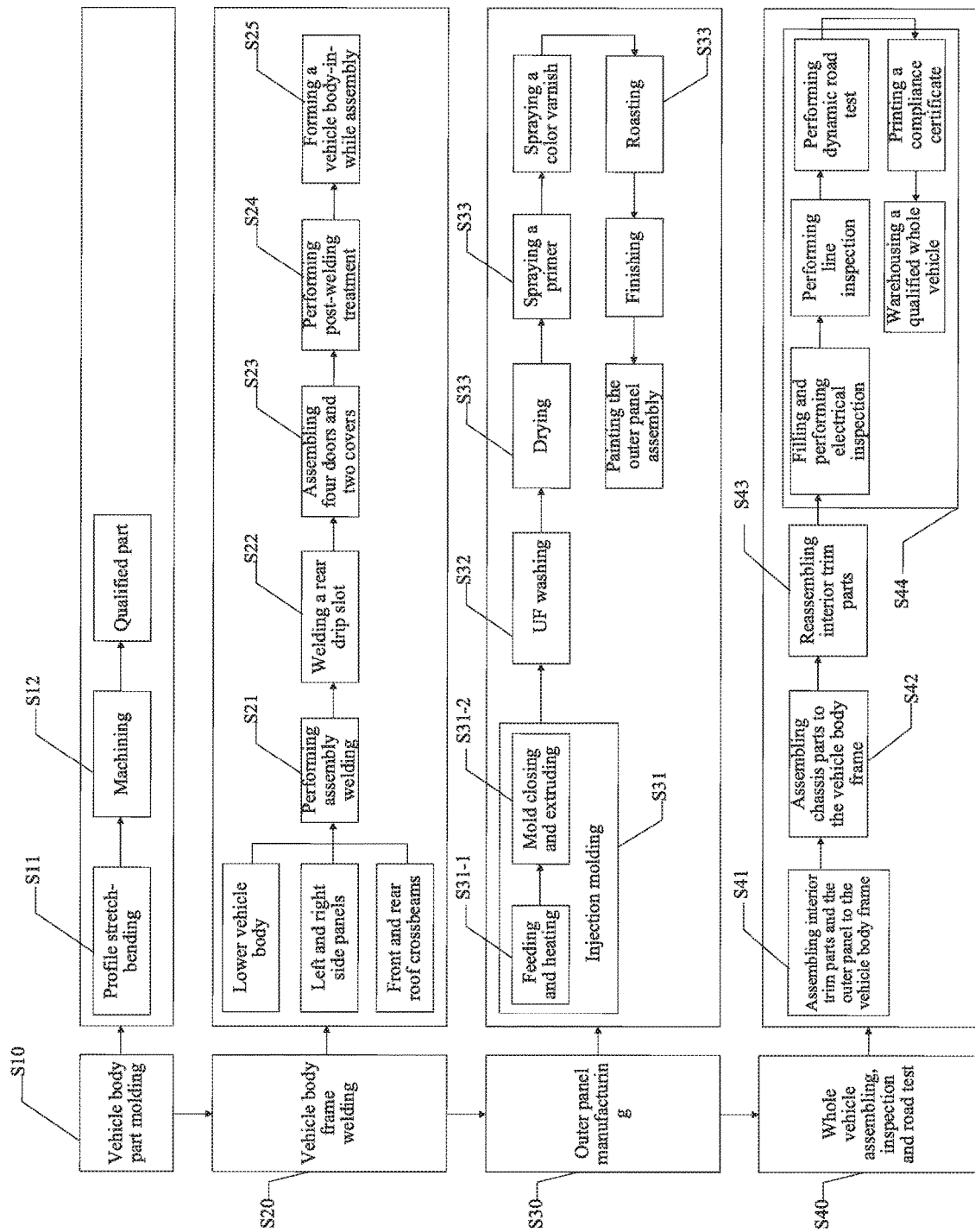
FIG. 2 is a schematic flowchart of a method for manufacturing a vehicle with an aluminum alloy body according to an embodiment of the present disclosure.

The present disclosure provides a method for manufacturing an aluminum alloy vehicle body. As shown in FIG. 2, the method includes the following steps: step S10, vehicle body part molding; step S20, vehicle body frame welding; and step S30, outer panel manufacturing. Step S10 includes: S11, profile stretch-bending; and S12, machining. Step S20 includes: S21, performing assembly welding on a lower vehicle body, left and right side panels, and front and rear roof crossbeams. Step S30 includes: S31, manufacturing an outer panel with a non-metallic composite material by injection molding.

As the vehicle body assembly is produced by using the aluminum alloy material and the non-metallic composite material to manufacture the vehicle body and the outer panel respectively, the production process flow is simplified, the production cost and the energy consumption are reduced, and the emission of various pollutants is reduced.

For the vehicle body parts, compared with an existing steel plate stamping molding, the stretch-bending molding can increase 45% of the material utilization rate of the parts. Each of the top side beam, the front roof crossbeam and the front windshield lower crossbeam only needs two steps (profile stretch-bending and machining) to complete the molding process of the body parts, which deletes at least two steps (uncoiling and blanking) compared with the prior art. Specifically, in the process of manufacturing the top side beam, the profile stretch-bending step S11 lasts for 40 seconds to 60 seconds. The machining step S12 includes section milling and drilling. In this way, compared with manufacturing top side beam by stamping molding, the processing time and the material consumption of the top side beam are reduced.

Figure 1:
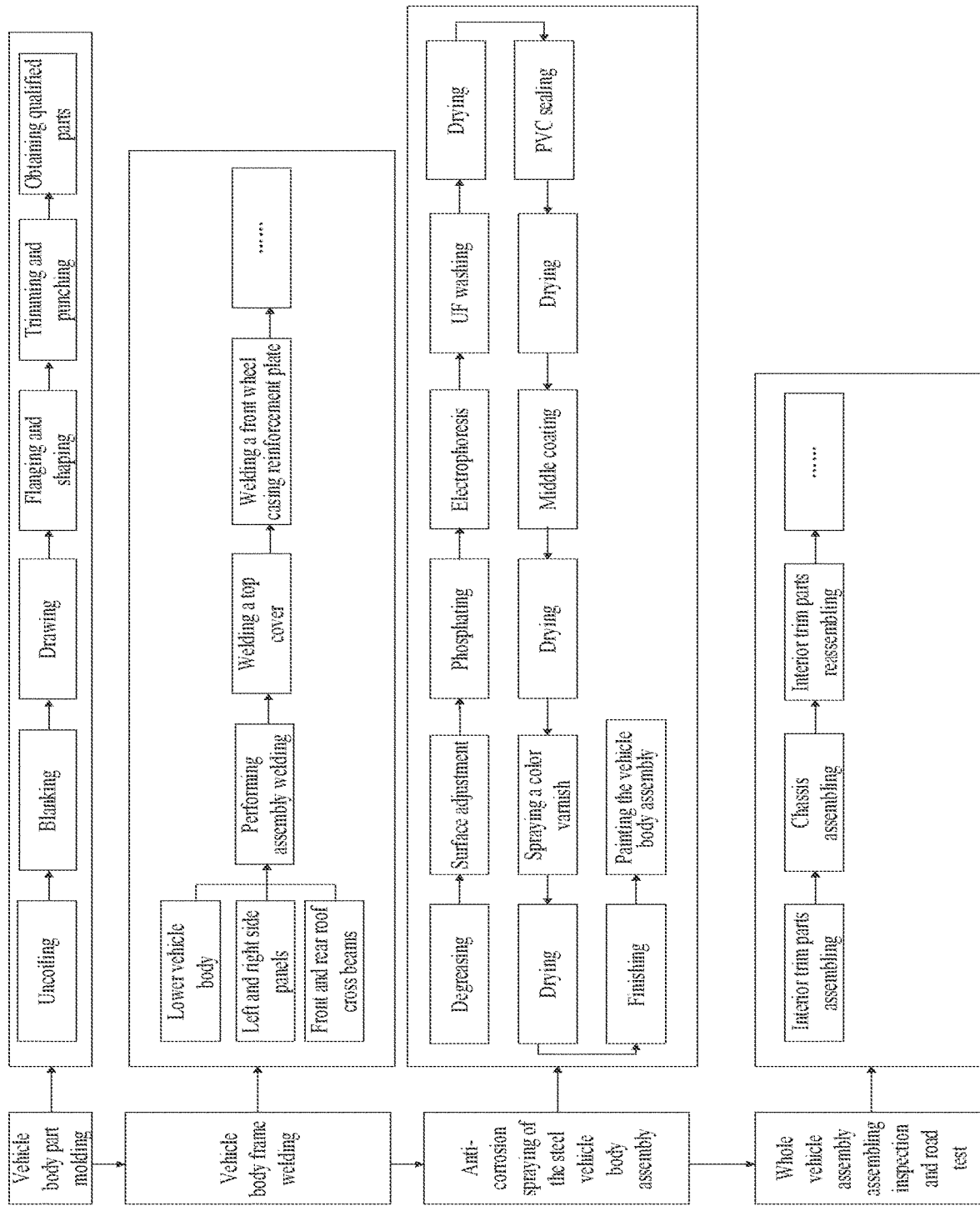
FIG. 1 is a schematic flowchart of a method for manufacturing a vehicle in the related art.

Further, step S20 further includes: S22, welding a rear drip slot; S23, assembling four doors and two covers; S24, performing post-welding treatment; and S25, forming a vehicle body-in-white assembly. It should be noted that the lower vehicle body, the left and right side panels, and the front and rear roof crossbeams have been separately welded and manufactured prior to the assembly welding. In addition, the top cover of the vehicle body of the vehicle manufactured by the method disclosed by the present disclosure may be integrally formed with the vehicle body frame in a non-welding manner, such that compared with the existing method for manufacturing the vehicle with the steel body shown in FIG. 1, a top cover welding step may be eliminated, thereby reducing the manufacturing time and cost. Further, the outer panel made of the non-metallic material and the rear drip slot are screwed and clamped, thereby providing higher maintainability and replaceability. Compared with a metallic outer panel, the non-metallic outer panel reduces steps, realizes additive manufacturing, and reduces weight. Moreover, the above vehicle body frame welding step is operated in a constant temperature and humidity environment to ensure the welding stability.

Compared with the prior art, manufacturing the outer panel by one-step molding can reduce at least 70% of the consumption of a mold raw material. The outer panel manufacturing step S30 is further described below. Specifically, in step S31, the injection molding includes: S31-1, feeding and heating; and S31-2, mold closing and extruding. Step S30 further includes: S32, successively performing UF washing and drying on injection-molded parts; and S33, successively performing primer spray, color varnish spray and roasting on the dried injection-molded parts. In addition, the vehicle body frame made of the aluminum alloy material has strong corrosion resistance, such that compared with the anti-corrosion spraying step of the steel vehicle body assembly in the existing vehicle manufacturing method, three drying steps are deleted. Therefore, the natural gas consumption is reduced by at least 120 $m^3$/h to 135 $m^3$/h, and the manufacturing time is shortened by about 90 minutes. Further, the two pre-treatment steps including surface adjustment and phosphating are eliminated, which reduces the consumption of the raw materials, shortens the manufacturing time by about 3 minutes, reduces the consumption of a raw material of an electrophoresis solution required in electrophoresis, and reduces the manufacturing time by about 4 minutes. Thus, six steps are totally eliminated, which shortens the manufacturing time by about 97 minutes, and reduces the power consumption of a single vehicle by above 75%.

Preferably, in the process of performing step S31, for the outer panel, a linear expansion coefficient is controlled to be less than 45 ppm/c, and a shrinkage rate is controlled to be less than 5%. In this way, not only are the connection and assembling of the outer panel and the vehicle body facilitated, but also use requirements for the outer panel on various occasions are met.

As a further improvement, after step S30 of the outer panel manufacturing, the manufacturing method further includes step S40 of whole vehicle assembling, inspection and road test. Step S40 includes: S41, assembling interior trim parts and the outer panel to the vehicle body frame; S42, assembling chassis parts to the vehicle body frame; S43, reassembling interior trim parts; and S44, filling and performing electrical inspection, performing line inspection and dynamic road test, printing a compliance certificate, and warehousing a qualified whole vehicle. As the outer panel formed by one-step injection molding is light in weight, the assembling is more convenient, and saves time and effort. Through step S44, it is ensured that the manufactured vehicle meets various use requirements.

Preferably, metal inert gas (MIG) welding is used in step S22, the welding current is 80 A to 160 A, and a voltage is 22 V to 24 V, such that the single-vehicle power consumption in the whole vehicle body frame welding step is about 47 kWh to 54 kWh, which greatly reduces the power consumption, compared with the single-vehicle power consumption the vehicle body frame welding process of about 90 kWh to 97 kWh in the prior art, thereby reducing the manufacturing cost. In addition, laser deep penetration welding, riveting, screwing and the like may be adopted.

Preferably, in step S32, the UF washing lasts for 20 seconds to 30 seconds, and the drying lasts for 30 seconds to 60 seconds at the temperature of 40° C. to 45° C. In step S33, the thickness of a primer is 10 µm to 15 µm, the thickness of a color varnish is 48 µm to 62 µm, and the roasting lasts for 25 minutes to 30 minutes at the temperature of 70° C. to 80° C. For the outer panel manufacturing step using the above parameters, the investment in the production line is controlled at about RMB 60 million, the power consumption of the single vehicle is about 70 kW to 77 kW, and the construction of the production line is about 1 year. Compared with the corresponding cost in the prior art that the investment in the production line reaches about RMB 200 million, the power consumption of the single vehicle is 300 kW to 367 kW, and the construction of the production line needs about 2 years, it is obvious that the manufacturing cost and time consumption are effectively controlled.

Preferably, the aluminum-magnesium alloy may be selected as the material of the vehicle body frame. It has been verified by tests that the aluminum-magnesium alloy has good corrosion resistance. Thus, under the premise of eliminating degreasing, surface adjustment, phosphating and electrophoresis, the excellent corrosion resistance of the vehicle body is still guaranteed.

The present disclosure further provides a vehicle with an aluminum alloy body manufactured by any of the above manufacturing methods. Therefore, it has the beneficial effects brought by the above manufacturing methods, such that for the vehicle, the manufacturing flow is greatly reduced, the weight is reduced by 40% compared with that of the vehicle of the same size in the prior art, the energy consumption is reduced by at least 20%, and the consumption of raw materials is reduced by more than 30%.

In the short-flow manufacturing method of the aluminum alloy vehicle body provided by the present disclosure, the outer panel made of the non-metallic composite material by injection molding is assembled to the vehicle body frame, such that the steps are reduced compared with the existing anti-corrosion spraying step of the steel vehicle body assembly, thereby shortening the manufacturing time and reducing the manufacturing cost. As the stretch-bending molding is used in the vehicle body part molding, compared with a traditional vehicle body part molding by stamping a steel plate, the steps are reduced, and the material utilization rate of the parts is increased by at least 45%. In the vehicle body frame welding, the vehicle body frame is made of the aluminum alloy material which is good in corrosion resistance. Compared with the prior art, there is no need of pretreatment and electrophoresis processing for the vehicle body frame, such that the steps and the cost are reduced. Thus, the manufacturing flow of the vehicle is sharply shortened, the weight is reduced compared with that of the vehicle of the same size in the prior art, and the energy consumption and the raw material consumption are reduced.

It should be clear that the detailed description of the known method is omitted here for the sake of brevity. In the above embodiments, several specific steps are described and shown as examples. However, the process of the method of the present disclosure is not limited to the specific steps described and shown, and their order may be changed according to actual manufacturing conditions or the steps may be performed simultaneously without conflict. Therefore, after understanding the spirit of the present disclosure, those skilled in the art can make various changes, modifications and additions, or change the order between the steps. That is, the present disclosure is not limited to the order of the above steps; and the steps may be run in the order mentioned in the embodiments, or in an order different from that in the above embodiments, or several steps may be run simultaneously.

In the method for manufacturing the aluminum alloy vehicle body and the vehicle with the aluminum alloy vehicle body according to the present disclosure, the production steps are greatly simplified, the manufacturing time is shortened, and the production cost is reduced. For the vehicle using the manufacturing method according to the present disclosure, the manufacturing flow is greatly reduced, the weight is reduced compared with that of the vehicle of the same size in the prior art, and the energy consumption and the raw material consumption are reduced, thereby providing an excellent application prospect.

Exemplary descriptions are given for the present disclosure with reference to the drawings in the above. However, the present disclosure is not limited to the above implementation manners. Any insubstantial improvements using the method concepts and technical solutions of the present disclosure or direct application of the present disclosure to other occasions shall fall into the protection scope of the present disclosure.

What is claimed is:

1. A method for manufacturing a vehicle body, comprising:
molding a vehicle body part, wherein molding the vehicle body part comprises profile stretch-bending and machining the vehicle body part;
welding a vehicle body frame assembly, wherein welding the vehicle body frame assembly comprises performing assembly welding on a lower vehicle body portion, left and right side panel portions, front and rear roof crossbeams portions, and a rear drip slot;
manufacturing an outer panel, wherein manufacturing the outer panel comprises:
manufacturing the outer panel by injection molding;
successively performing ultrafiltration (UF) washing and drying on the injection-molded parts, wherein during successively performing the UF washing and drying on the injection-molded parts, the UF washing lasts for 20 seconds to 30 seconds, and the drying lasts for 30 seconds to 60 seconds at a temperature of 40° C. to 45° C.;
successively performing primer spray, color varnish spray and roasting on the dried injection-molded parts, wherein during performing the primer spray, the color varnish spray and the roasting on the dried injection-molded parts, a thickness of the primer is 10 µm to 15 µm, a thickness of the color varnish is 48 µm to 62 µm, and the roasting lasts for 25 minutes to 30 minutes at a temperature of 70° C. to 80° C.; and
assembling a vehicle, wherein assembling the vehicle comprises assembling one or more interior trim parts and the outer panel to the vehicle body frame assembly, and assembling one or more chassis parts to the vehicle body frame assembly, wherein assembling the outer panel to the vehicle body frame assembly comprises screwing and clamping the outer panel with the rear drip slot of the vehicle body frame assembly;
wherein the vehicle body frame assembly is made of an aluminum alloy material, and the outer panel is made of a non-metallic composite material.

2. The method for manufacturing a vehicle body according to claim 1, wherein manufacturing the outer panel by injection molding comprises: feeding and heating, and mold closing and extruding.

3. The method for manufacturing a vehicle body according to claim 1, wherein during manufacturing the outer panel by the injection molding, for the outer panel, a linear expansion coefficient is controlled to be less than 45 ppm/c, and a shrinkage rate is controlled to be less than 5%.

4. The method for manufacturing a vehicle body according to claim 1, wherein assembling the vehicle further comprises: reassembling interior trim parts; and filling and performing electrical inspection, performing line inspection and dynamic road test, printing a compliance certificate, and warehousing a qualified whole vehicle.

5. The method for manufacturing a vehicle body according to claim 1, wherein the material of the vehicle body frame comprises an aluminum-magnesium alloy.

6. The method for manufacturing a vehicle body according to claim 1, wherein the welding the vehicle body frame assembly comprises:
   assembling four doors and two covers;
   performing post-welding treatment; and
   forming a vehicle body-in-white assembly.

7. The method for manufacturing a vehicle body according to claim 6, wherein metal inert gas (MIG) welding is adopted in the welding of the rear drip slot, with a welding current of 80 A to 160 A and a voltage of 22 V to 24 V.

\* \* \* \* \*